(12) United States Patent
Cao et al.

(10) Patent No.: US 10,389,132 B2
(45) Date of Patent: Aug. 20, 2019

(54) AC-DC PHOTOVOLTAIC DEVICE

(71) Applicant: SUNGROW POWER SUPPLY CO., LTD., Hefei, Anhui (CN)

(72) Inventors: Renxian Cao, Anhui (CN); Yilei Gu, Anhui (CN); Yu Gu, Anhui (CN); Jun Xu, Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 159 days.

(21) Appl. No.: 15/474,061

(22) Filed: Mar. 30, 2017

(65) Prior Publication Data

US 2017/0324249 A1 Nov. 9, 2017

(30) Foreign Application Priority Data

May 9, 2016 (CN) .......................... 2016 1 0305675

(51) Int. Cl.
*H02J 7/34* (2006.01)
*H02J 1/10* (2006.01)
(Continued)

(52) U.S. Cl.
CPC .............. *H02J 3/383* (2013.01); *F21S 8/085* (2013.01); *F21S 9/03* (2013.01); *H02M 3/158* (2013.01); *H02M 7/53871* (2013.01); *H02P 7/28* (2013.01); *F21Y 2115/10* (2016.08); *H02M 1/10* (2013.01); *H02M 1/126* (2013.01); *H02M 7/487* (2013.01); *H02M 7/5395* (2013.01); *H02M 2001/0077* (2013.01); *Y02E 10/563* (2013.01)

(58) Field of Classification Search
CPC .... H02J 3/383; H02M 3/158; H02M 7/53871; H02M 7/44; H02M 7/5395; H02P 7/28; F21S 8/085; F21S 9/03
See application file for complete search history.

(56) References Cited

U.S. PATENT DOCUMENTS

| 6,282,111 B1 * | 8/2001 | Illingworth ....... H02M 7/53871 363/132 |
| 2009/0141522 A1 * | 6/2009 | Adest ...................... H02J 1/102 363/55 |

(Continued)

FOREIGN PATENT DOCUMENTS

| GB | 2483317 A | 3/2012 |
| JP | H09135583 A | 5/1997 |

(Continued)

OTHER PUBLICATIONS

Extended European Search Report for corresponding Application No. 17163347.2-1809; dated Sep. 26, 2017.

(Continued)

*Primary Examiner* — Rexford N Barnie
*Assistant Examiner* — Rasem Mourad
(74) *Attorney, Agent, or Firm* — Cantor Colburn LLP

(57) ABSTRACT

An AC-DC photovoltaic device is provided, including: a photovoltaic module, a direct current side capacitor, a DC-PWM power switching circuit and a controller. The direct current side capacitor is connected in parallel with an output terminal of the photovoltaic module. An input terminal of the DC-PWM power switching circuit is connected with the output terminal of the photovoltaic module. The DC-PWM power switching circuit includes a controllable switch transistor. The controller is configured to output a switch control signal to control a switching state of the controllable switch transistor in the DC-PWM power switching circuit, to control the DC-PWM power switching circuit to output a direct current PWM wave in a case that the switch control signal is a direct current modulation signal, and output an alternating current PWM wave in a case that the switch control signal is an alternating current modulation signal.

17 Claims, 14 Drawing Sheets

(51) Int. Cl.

| | | |
|---|---|---|
| *H02J 3/38* | (2006.01) |
| *H02P 7/28* | (2016.01) |
| *F21S 8/08* | (2006.01) |
| *F21S 9/03* | (2006.01) |
| *H02M 3/158* | (2006.01) |
| *H02M 7/5387* | (2007.01) |
| *F21Y 115/10* | (2016.01) |
| *H02M 1/10* | (2006.01) |
| *H02M 1/12* | (2006.01) |
| *H02M 7/487* | (2007.01) |
| *H02M 7/5395* | (2006.01) |
| *H02M 1/00* | (2006.01) |

(56) References Cited

U.S. PATENT DOCUMENTS

| | | | |
|---|---|---|---|
| 2012/0057380 A1* | 3/2012 | Abe | H02M 7/487 363/62 |
| 2012/0175964 A1 | 7/2012 | Yoscovich et al. | |
| 2016/0226254 A1* | 8/2016 | Cheng | H02J 3/383 |
| 2018/0006545 A1* | 1/2018 | Fullmer | B64D 41/00 |

FOREIGN PATENT DOCUMENTS

| | | |
|---|---|---|
| JP | 2000050638 A | 2/2000 |
| JP | 2003088130 A | 3/2003 |
| JP | 2004201394 A | 7/2004 |
| JP | 2015053817 A | 3/2015 |
| JP | 2015509355 A | 3/2015 |
| JP | 2017135890 A | 8/2017 |
| WO | 2013080469 A1 | 6/2013 |
| WO | 2013107782 A2 | 7/2013 |
| WO | 2014143021 A1 | 9/2014 |

OTHER PUBLICATIONS

First Office Action for corresponding JP Application No. 2017-067017; dated Oct. 10, 2017.

Second Office Action for corresponding JP Application No. 2017-067017; dated Apr. 17, 2018.

* cited by examiner

AC-DC PHOTOVOLTAIC DEVICE

CROSS REFERENCE TO RELATED APPLICATION

The present application claims the priority to Chinese Patent Application No. 201610305675.6, titled "AC-DC PHOTOVOLTAIC DEVICE", filed on May 9, 2016 with the State Intellectual Property Office of the People's Republic of China, which is incorporated herein by reference in its entirety.

TECHNICAL FIELD

The present disclosure relates to the field of photovoltaic power generation technology, and in particular to an alternating-current direct-current (AC-DC) photovoltaic device.

BACKGROUND

A conventional photovoltaic module typically includes solar cells, a frame, a glass, a backboard and a junction box. A bypass diode is generally arranged inside the junction box. The bypass diode is inversely connected across a group of serially connected solar cells. The bypass diode is forward biased into conduction in a case that solar cells are shadowed or in fault, thus protecting the solar cells. To improve the conventional module, the conventional diode is replaced with a Metal-Oxide-Semiconductor Field-Effect Transistor (MOSFET) by some manufacturers to improve efficiency, and data acquisition and communication systems are integrated by some other manufacturers. The conventional photovoltaic module normally is simple in function, and needs an external converter to be connected with the grid or to supply power to a load. FIG. 1 shows an example of a conventional photovoltaic module.

For the disadvantage of the conventional photovoltaic modules, a direct current modular photovoltaic module and an alternating current modular photovoltaic module are developed.

FIG. 2 is a schematic diagram of a direct current modular photovoltaic module.

The direct current modular photovoltaic module includes a conventional photovoltaic module, a DC/DC power switching circuit and a controller. The direct current modular photovoltaic module outputs direct current power and can realize the maximum power point tracking (MPPT). The direct current modular photovoltaic module outputs a direct current voltage, which may be employed alone as a direct current bus, or may be connected in series to form a higher voltage direct current bus.

FIG. 3 is a schematic diagram of an alternating current modular photovoltaic module.

The alternating current modular photovoltaic module includes a conventional photovoltaic module, a DC/AC power switching circuit and a controller. The alternating current modular photovoltaic module outputs alternating current power and can be connected with the grid directly or supply power to an alternating current load directly.

Among the three photovoltaic modules described above, the first described conventional module cannot achieve power regulation. Although the other two can achieve power conversion and achieve independent MPPT, the modules can only output either an alternating current voltage or a direct current voltage. For a diversity of photovoltaic applications in the future, the above techniques lack flexibility and versatility.

SUMMARY

In order to address the above technical issues in the conventional art, the present disclosure provides an alternating-current direct-current (AC-DC) photovoltaic device which can be controlled to output either of alternating current power and direct current power, which is of high flexibility and versatility and can be adapted to a diversity of photovoltaic applications in the future.

An embodiment of the present disclosure provides an AC-DC photovoltaic device, including: a photovoltaic module, a direct current side capacitor, a direct current pulse width modulation (DC-PWM) power switching circuit, and a controller;

the direct current side capacitor is connected in parallel with an output terminal of the photovoltaic module;

an input terminal of the DC-PWM power switching circuit is connected with the output terminal of the photovoltaic module;

the DC-PWM power switching circuit includes a controllable switch transistor;

the controller is configured to output a switch control signal to control a switching state of the controllable switch transistor in the DC-PWM power switching circuit, to control the DC-PWM power switching circuit to output a direct current PWM wave in a case that the switch control signal is a direct current modulation signal, and output an alternating current PWM wave in a case that the switch control signal is an alternating current modulation signal.

Preferably, the DC-PWM power switching circuit is a full-bridge circuit.

Preferably, the DC-PWM power switching circuit is a three-level inverter topology circuit.

Preferably, the DC-PWM power switching circuit is configured to output a direct current PWM wave, and a load is a direct current motor or a Light Emitting Diode (LED) streetlamp.

Preferably, the DC-PWM power switching circuit is configured to output the direct current PWM wave; and multiple said AC-DC photovoltaic devices are connected in series to supply power to a high-voltage direct current communication system.

Preferably, the DC-PWM power switching circuit is configured to output the direct current PWM wave; and multiple said AC-DC photovoltaic devices are connected in series or in series-parallel, and then connected with an input terminal of an inverter, an output terminal of the inverter is connected with the alternating current grid.

Preferably, the AC-PWM power switching circuit is configured to output an alternating current PWM wave; and multiple said AC-DC photovoltaic devices are connected in series to supply power to a household appliance, or connected in series and then connected with an alternating current grid, or connected in series-parallel and then connected with an alternating current grid.

Preferably, the text processing device further includes: a filter circuit.

The filter circuit is configured to filter a harmonic component out of the direct current PWM wave or the alternating current PWM wave outputted from the DC-PWM power switching circuit.

The technical solution in the present disclosure has at least the following advantages over the conventional art.

The DC-PWM power switching circuit is controlled to output a direct current PWM wave or an alternating current PWM wave, by the switch control signal outputted by the controller. In a case that the switch control signal is a direct current modulation signal, the DC-PWM power switching circuit outputs the direct current PWM wave, and in a case that the switch control signal is an alternating current modulation signal, the DC-PWM power switching circuit outputs the alternating current PWM wave. Therefore the photovoltaic device can be applied to both direct current power supply occasions and alternating current power supply occasions, thus improving the versatility of the photovoltaic device.

BRIEF DESCRIPTION OF THE DRAWINGS

In order to illustrate technical solutions in embodiments of the present disclosure or in the conventional technology more clearly, drawings used in the description of the embodiments or the conventional technology are introduced briefly hereinafter. Apparently, the drawings described hereinafter merely illustrate some embodiments of the present disclosure, and other drawings may be obtained by those skilled in the art based on these drawings without any creative efforts.

DETAILED DESCRIPTION OF THE EMBODIMENTS

For a better understanding of the present disclosure by those skilled in the art, the technical solutions according to the embodiments of the present disclosure will be described with details in conjunction with the drawings. It is clear that the disclosed embodiments are a few of the embodiments of the present disclosure, rather than all of the embodiments. Other embodiments obtained by those skilled in the art based on the embodiments of the present disclosure without any creative work, fall into the scope of the present disclosure.

First Embodiment

Figure 1:
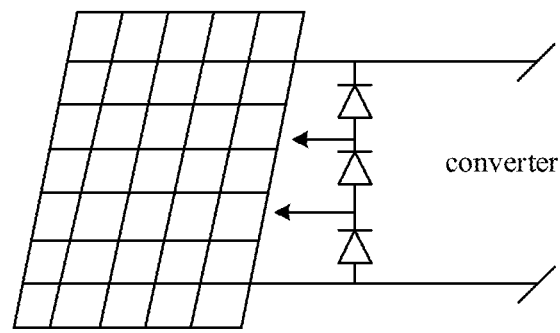
FIG. 1 is a schematic diagram of a conventional photovoltaic module.
Figure 2:
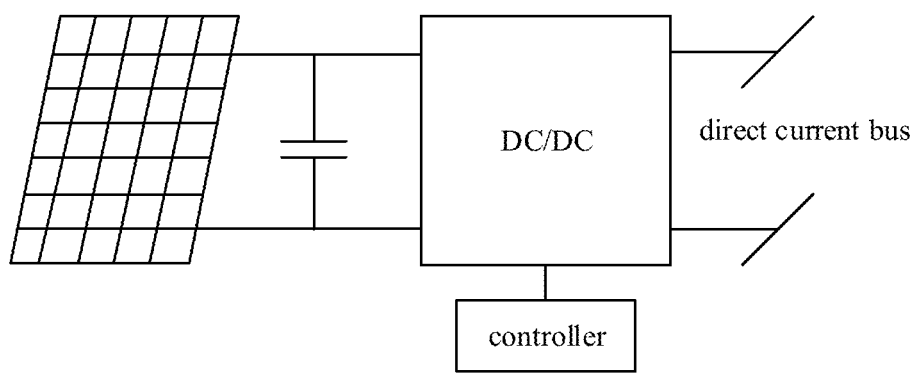
FIG. 2 is a schematic diagram of a photovoltaic system for supplying power to a direct current load in the conventional art.
Figure 3:
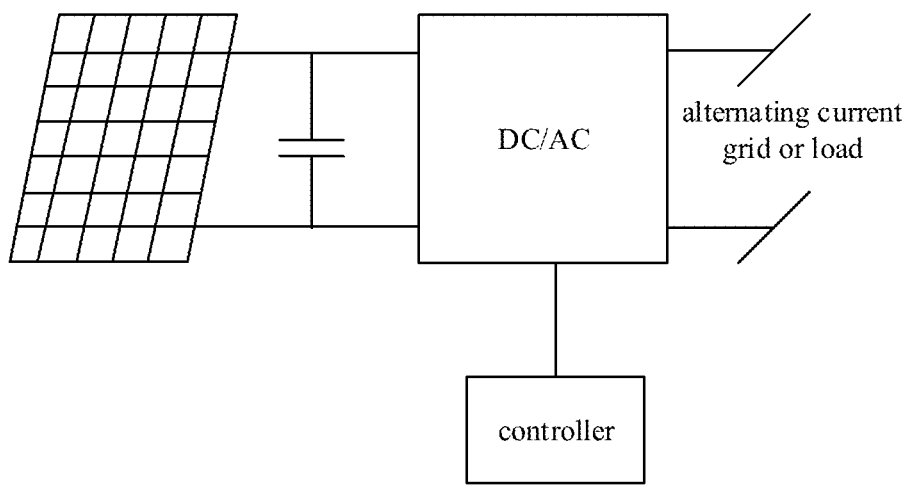
FIG. 3 is a schematic diagram of a photovoltaic system for supplying power to an alternating current load in the conventional art.
Figure 4:
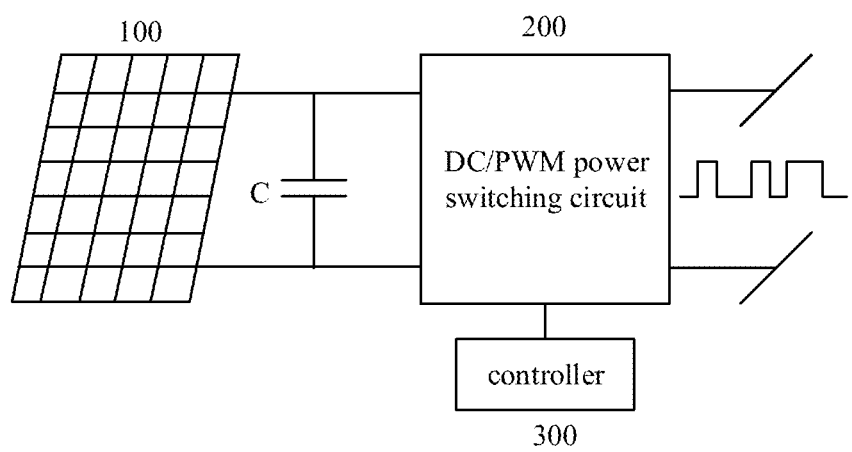
FIG. 4 is a schematic diagram of an AC-DC photovoltaic device according to a first embodiment of the present disclosure.

FIG. 4 is a schematic diagram of an AC-DC photovoltaic device according to a first embodiment of the present disclosure.

The AC-DC photovoltaic device according to the present embodiment includes: a photovoltaic module 100, a direct current side capacitor C, a direct current pulse width modulation (DC-PWM) power switching circuit 200, and a controller 300.

The direct current side capacitor C is connected in parallel with an output terminal of the photovoltaic module 100.

An input terminal of the DC-PWM power switching circuit 200 is connected with the output terminal of the photovoltaic module.

The DC-PWM power switching circuit 200 includes a controllable switch transistor.

The controller 300 is configured to output a switch control signal to control a switching state of the controllable switch transistor in the DC-PWM power switching circuit 200, to control the DC-PWM power switching circuit 200 to output a direct current PWM wave or an alternating current PWM wave. In a case that the switch control signal is a direct current modulation signal, the DC-PWM power switching circuit outputs the direct current PWM wave. In a case that the switch control signal is an alternating current modulation signal, the DC-PWM power switching circuit outputs the alternating current PWM wave.

The direct current PWM wave includes a direct current modulation component and a harmonic component. The alternating current PWM wave includes an alternating current modulation component and a harmonic component.

Understandably, an objective of the present disclosure is to control the photovoltaic module to output direct current power in a case of a load requiring direct current power, and output alternating current power in a case of a load requiring alternating current power. In the case that the switch control signal is a direct current modulation signal, a direct current PWM wave is outputted, which includes a direct current modulation component and a harmonic component. Only the direct current component is left after filtering.

It should be noted that the photovoltaic module 100 according to the embodiments of the present disclosure may include multiple photovoltaic panels connected in series, or multiple photovoltaic panels connected in parallel, or multiple photovoltaic panels connected in series-parallel.

Understandably, the photovoltaic module 100 outputs direct current power and the DC-PWM power switching circuit 200 may convert the direct current power into a PWM wave signal for output.

It should be noted that the controller 300 may not only output the switch control signal, but also perform other controls, such as monitoring a status of the photovoltaic module or a photovoltaic panel, realizing the maximum power point tracking (MPPT), and performing functions of protection, communication and the like.

The controller 300 may be implemented in the form of an MCU or a DSP, etc.

In the photovoltaic device according to this embodiment, the DC-PWM power switching circuit is controlled to output a direct current PWM wave or an alternating current PWM wave, by the switch control signal outputted by the controller. In a case that the switch control signal is a direct current modulation signal, the DC-PWM power switching circuit outputs the direct current PWM wave. In a case that the switch control signal is an alternating current modulation signal, the DC-PWM power switching circuit outputs the alternating current PWM wave. Therefore the photovoltaic device can be applied to both direct current power supply occasions and alternating current power supply occasions, thus improving the versatility of the photovoltaic device.

Second Embodiment

Figure 5A:
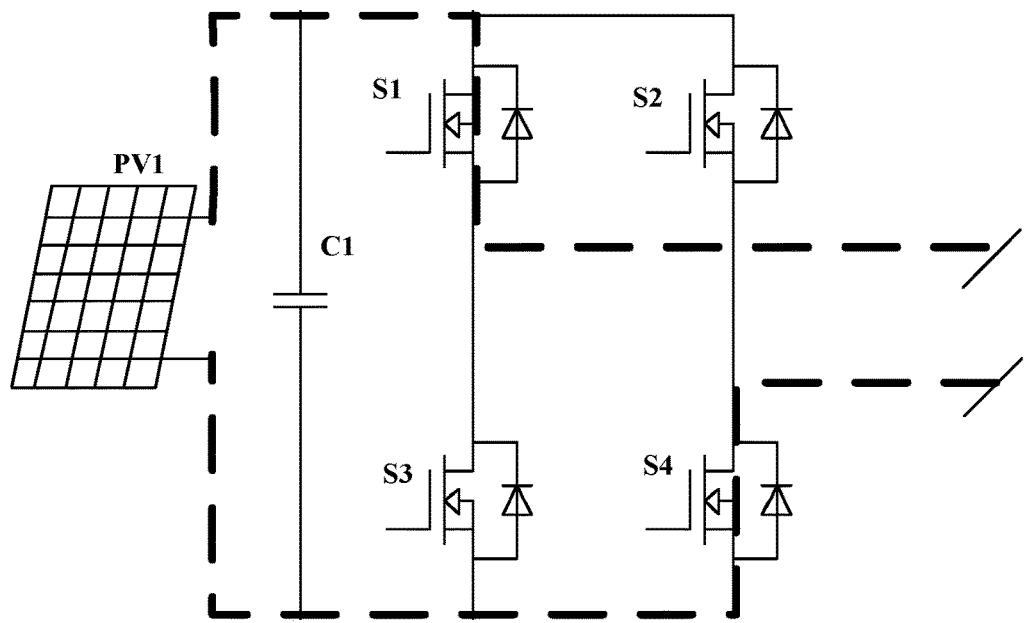
FIG. 5A is a schematic diagram showing that a photovoltaic device according to the present disclosure outputs a level of +1.
Figure 5B:
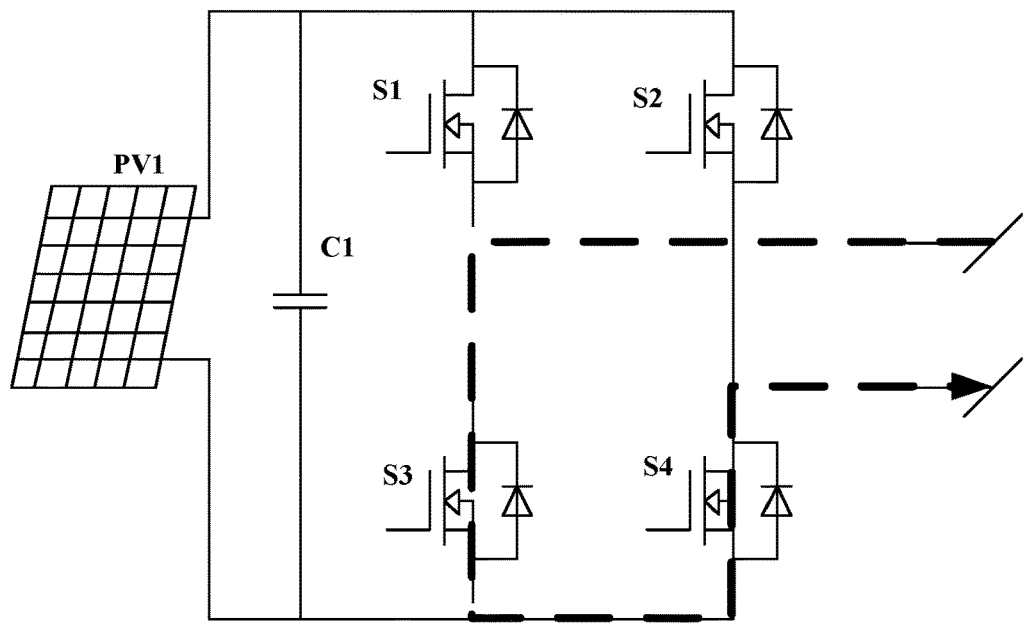
FIG. 5B is a schematic diagram showing that a photovoltaic device according to the present disclosure outputs a level of 0.
Figure 5C:
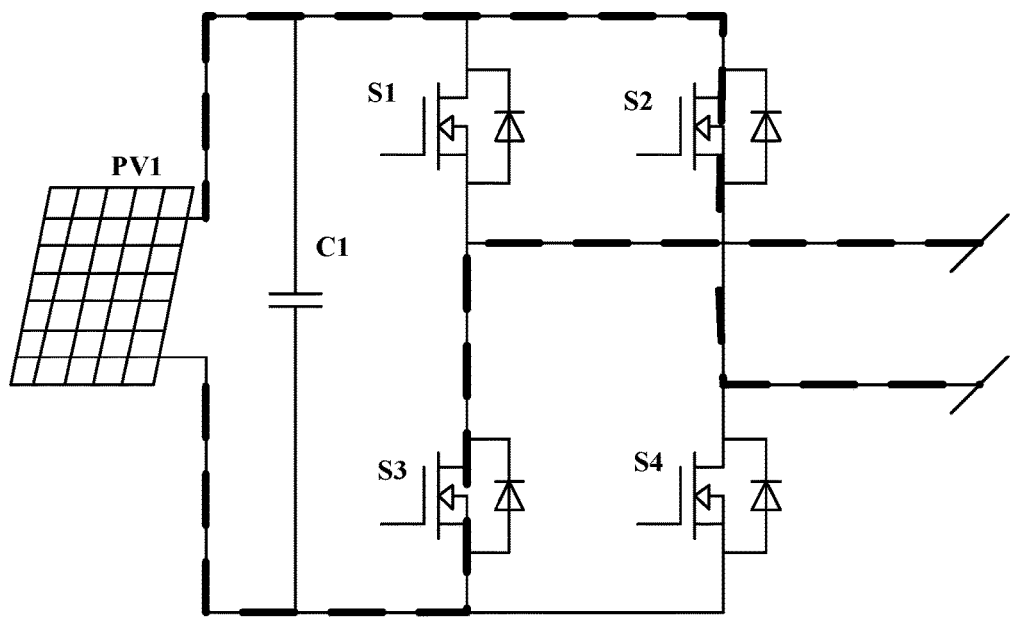
FIG. 5C is a schematic diagram showing that a photovoltaic device according to the present disclosure outputs a level of −1.

FIGS. 5A to 5C are schematic diagrams of an AC-DC photovoltaic device according to a second embodiment of the present disclosure.

The present embodiment is described with an example that the DC-PWM power switching circuit is implemented by a full-bridge circuit.

Referring to FIGS. 5A to 5C, the full-bridge circuit includes four controllable switch transistors S1 to S4. By controlling switching states of the four controllable switch transistors, the full-bridge circuit is controlled to output different levels.

Specifically, levels of +1, 0 and −1 may be generated. FIG. 5A shows that a level +1 is generated in a case that S1 and S4 are on while S2 and S3 are off in a full H-bridge circuit.

FIG. 5B shows that a level 0 is generated in a case that S3 and S4 are on while S1 and S2 are off in a full H-bridge circuit. It should be noted that in the full H-bridge circuit, the level 0 is also generated in a case that S3 and S4 are off while S1 and S2 are on, which is not illustrated.

FIG. 5C shows that a level −1 is generated in a case that S2 and S3 are on while S1 and S4 are off in a full H-bridge circuit.

Understandably, the PWM wave is a pulse width signal which includes at least two of the three levels of +1, 0 and −1.

Taking a modulation frequency of 1 kHz as an example, FIGS. 6A to 6E show PWM waveforms in which the modulation wave include levels of +1, 0 and −1.

Figure 6A:
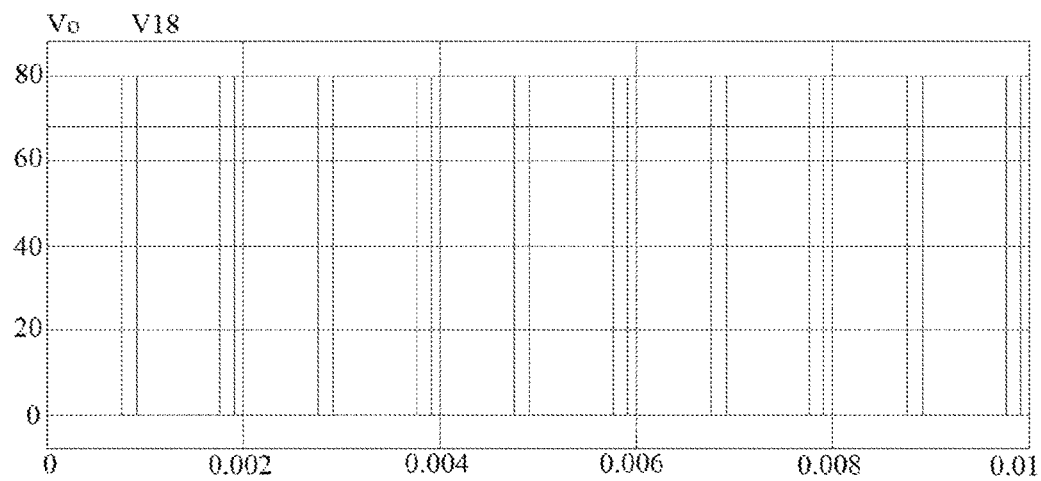
FIG. 6A shows a PWM waveform in a case that a switch control signal is a positive direct current quantity according to the present disclosure.

FIG. 6A shows a PWM waveform in a case that a switch control signal is a positive direct current quantity, which includes two levels of +1 and 0.

Figure 6B:
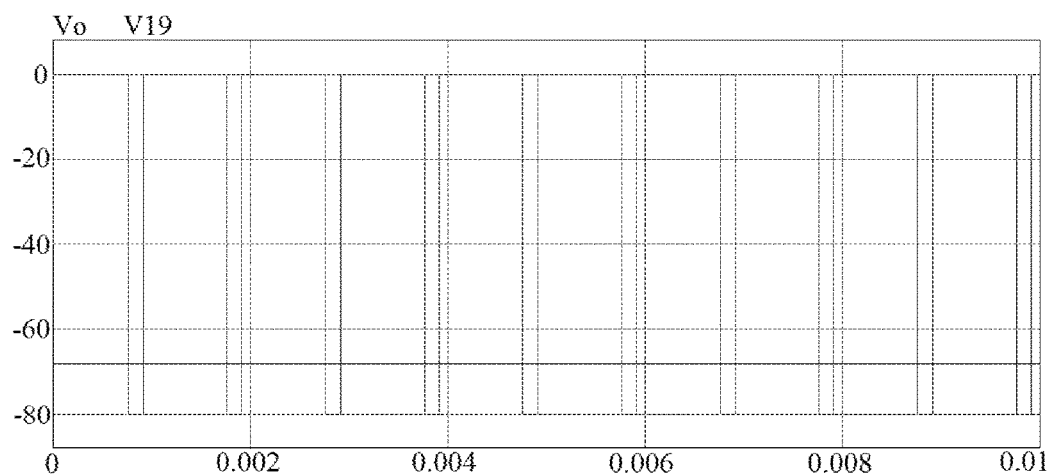
FIG. 6B shows a PWM waveform in a case that a switch control signal is a negative direct current quantity according to the present disclosure.

FIG. 6B shows a PWM waveform in a case that a switch control signal is a negative direct current quantity, which includes two levels of −1 and 0.

Figure 6C:
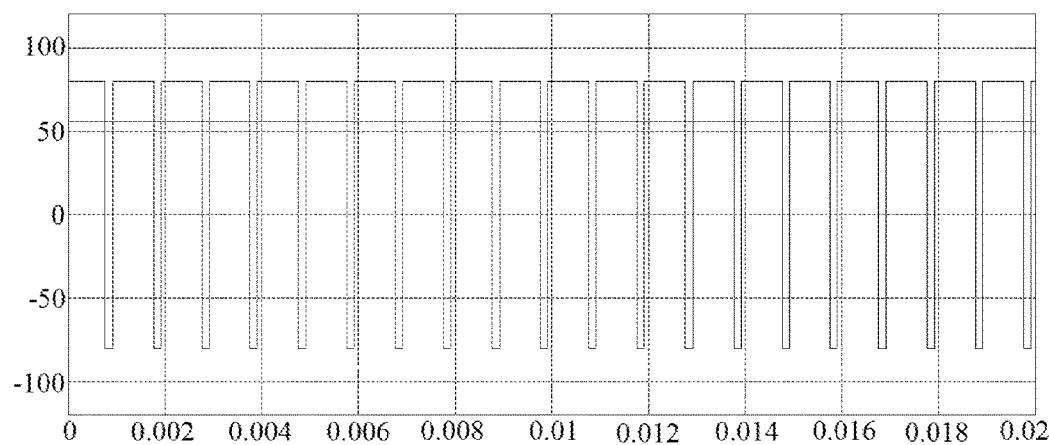
FIG. 6C shows a PWM waveform in a case that a switch control signal is a positive direct current quantity according to the present disclosure.

FIG. 6C shows a PWM waveform in a case that a switch control signal is a positive direct current quantity, which includes two levels of +1 and −1.

Figure 6D:
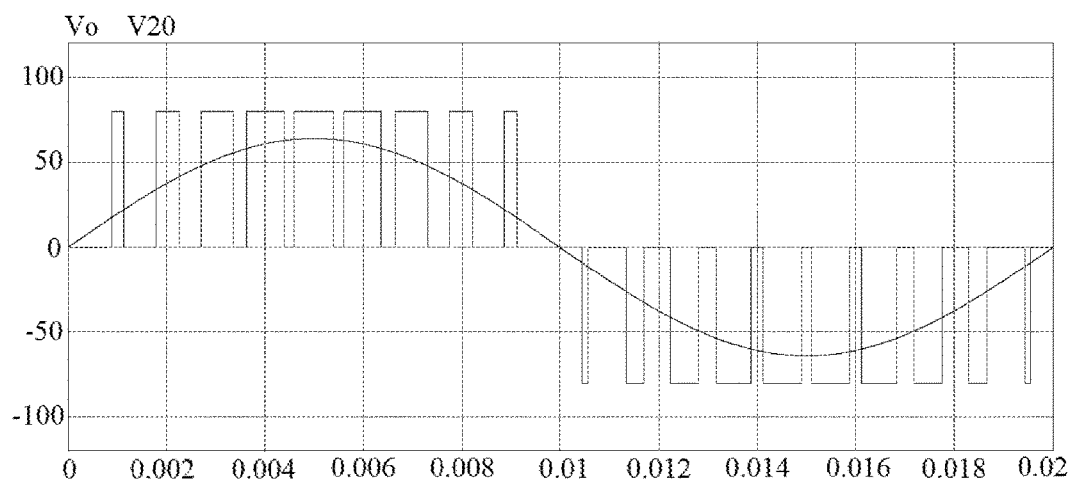
FIG. 6D shows a PWM waveform in a case that a switch control signal is a unipolar sinusoidal quantity according to the present disclosure.

FIG. 6D shows a PWM waveform in a case that a switch control signal is a unipolar sinusoidal quantity, which includes three levels of +1, 0 and −1.

Figure 6E:
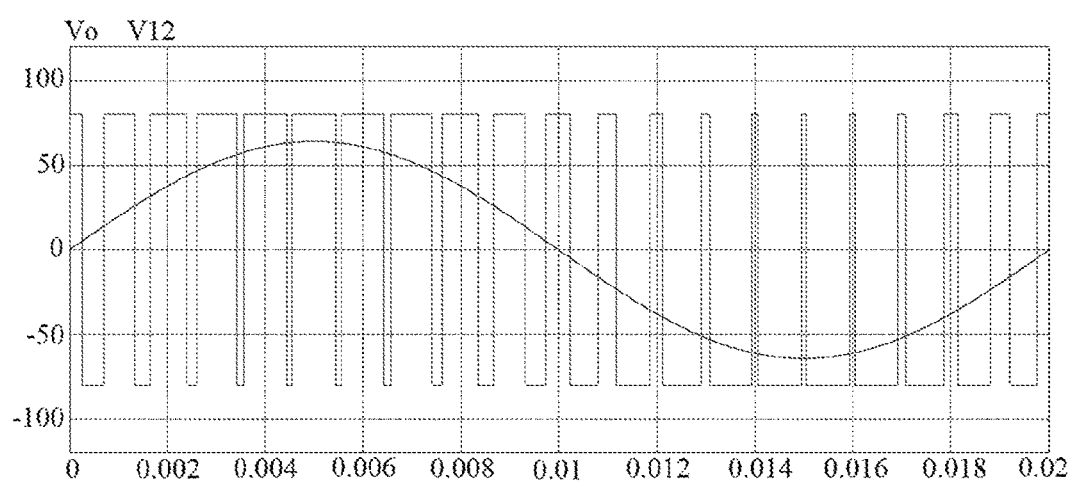
FIG. 6E shows a PWM waveform in a case that a switch control signal is a bipolar sinusoidal quantity according to the present disclosure.

FIG. 6E shows a PWM waveform in a case that a switch control signal is a unipolar sinusoidal quantity, which includes two levels of +1 and −1.

Figure 7:
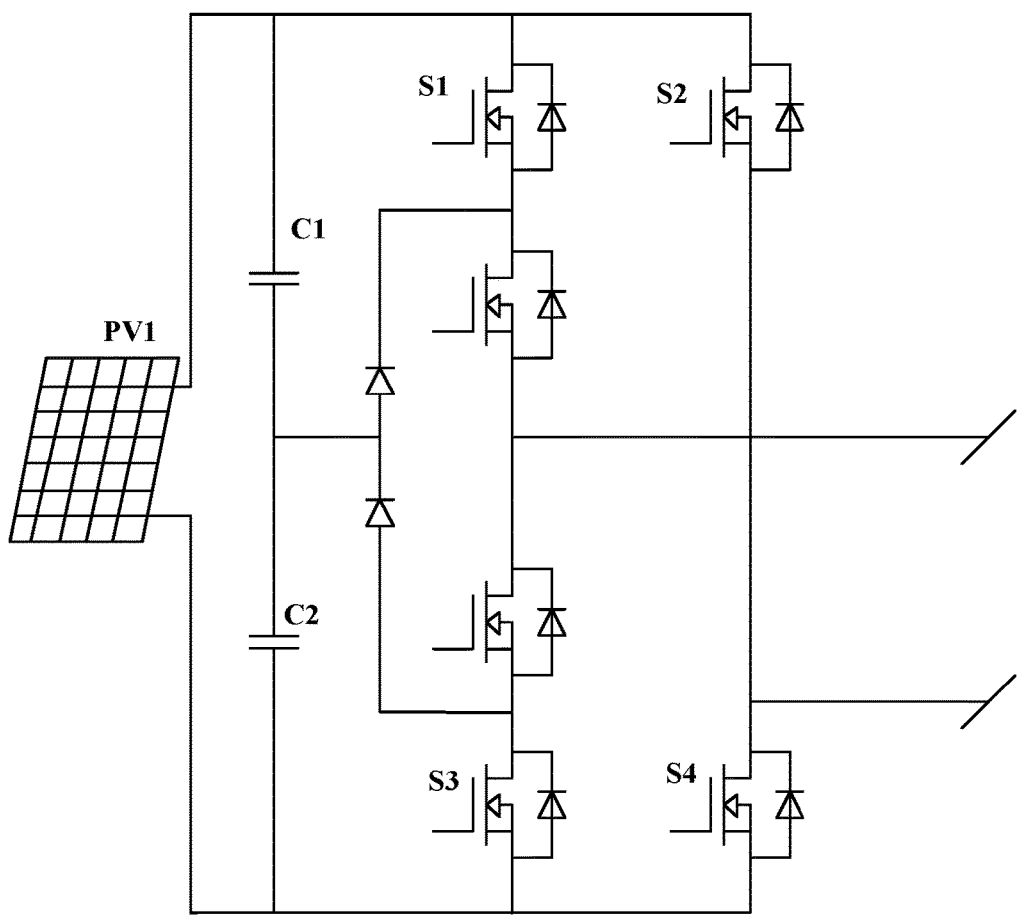
FIG. 7 is a schematic diagram of a DC-PWM power switching circuit implemented by a three-level single-phase inverter circuit according to the present disclosure.

It should be noted that the description is given with the example that the DC-PWM power switching circuit is a full-bridge circuit. Understandably, the DC-PWM power switching circuit may also be implemented by a derivative circuit of the full-bridge circuit. For example, a derivative multi-level topology can be implemented by a three-level single-phase inverter circuit as shown in FIG. 7.

The AC-DC photovoltaic device according to the above embodiments is highly versatile and can be applied to both direct current power supply occasions and alternating current power supply occasions. The applications of the AC-DC photovoltaic device is described in detail in conjunction with the drawings.

Figure 8A:
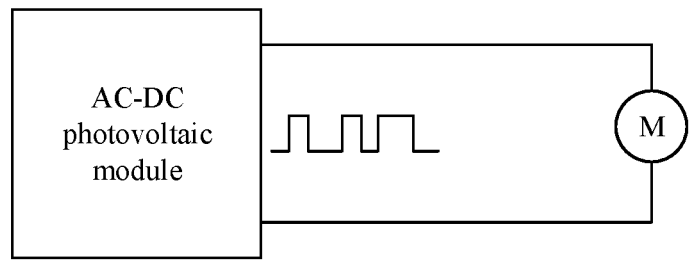
FIG. 8A is a schematic diagram of a photovoltaic device supplying power to a direct current motor according to the present disclosure.

FIG. 8A shows that the load is a direct current motor M in a case that the AC-DC photovoltaic device is configured to output a direct current PWM wave, that is, the device supplies power to M.

Figure 8B:
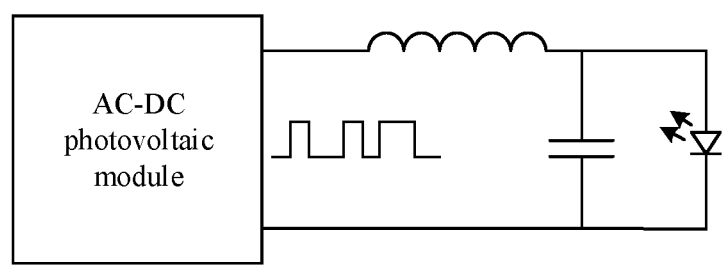
FIG. 8B is a schematic diagram of a photovoltaic device supplying power to an LED lamp according to the present disclosure.

FIG. 8B shows that the load is a direct current LED lamp in a case that the AC-DC photovoltaic device is configured to output a direct current PWM wave, that is, the device supplies power to the LED lamp.

Figure 8C:
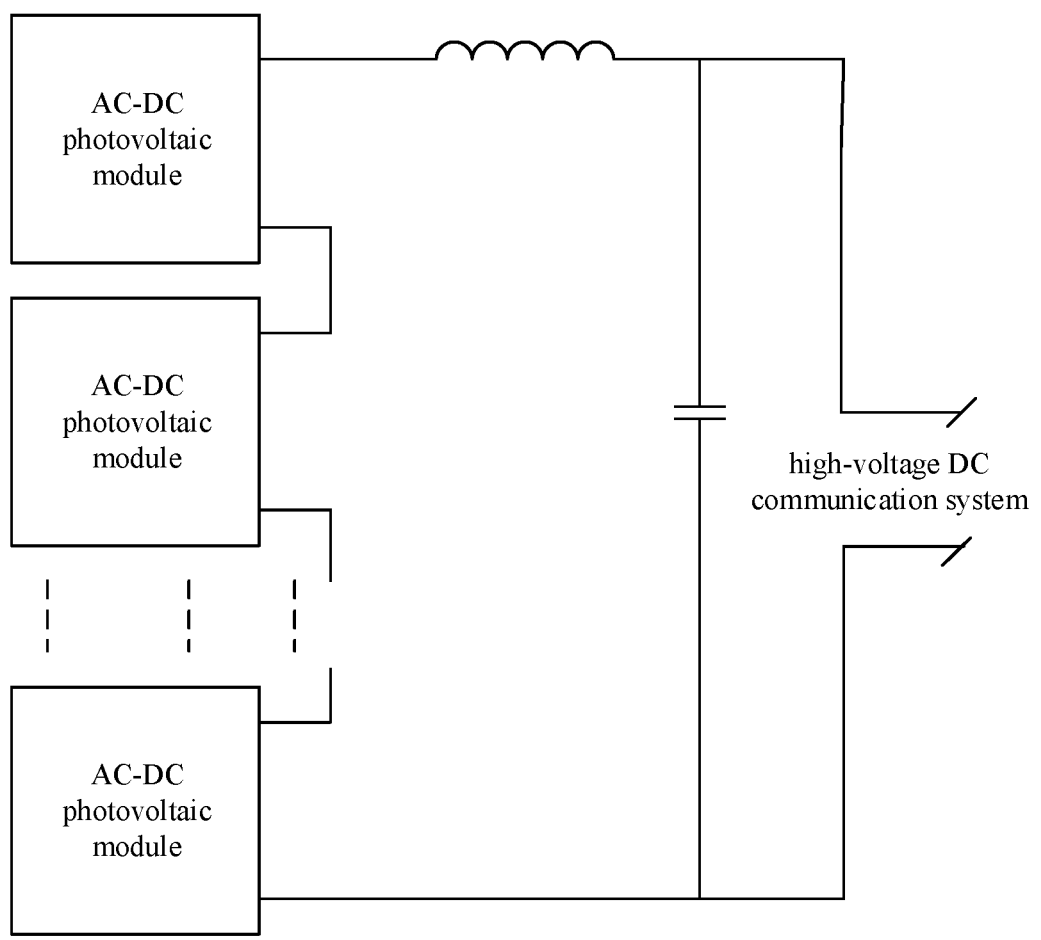
FIG. 8C is a schematic diagram of a photovoltaic device supplying power to a high-voltage direct current communication system according to the present disclosure.

Reference is made to FIG. 8C, in which there are multiple said photovoltaic devices connected in series to supply power to a high-voltage direct current communication system in the case that the DC-PWM power switching circuit is configured to output a direct current PWM wave.

Figure 8D:
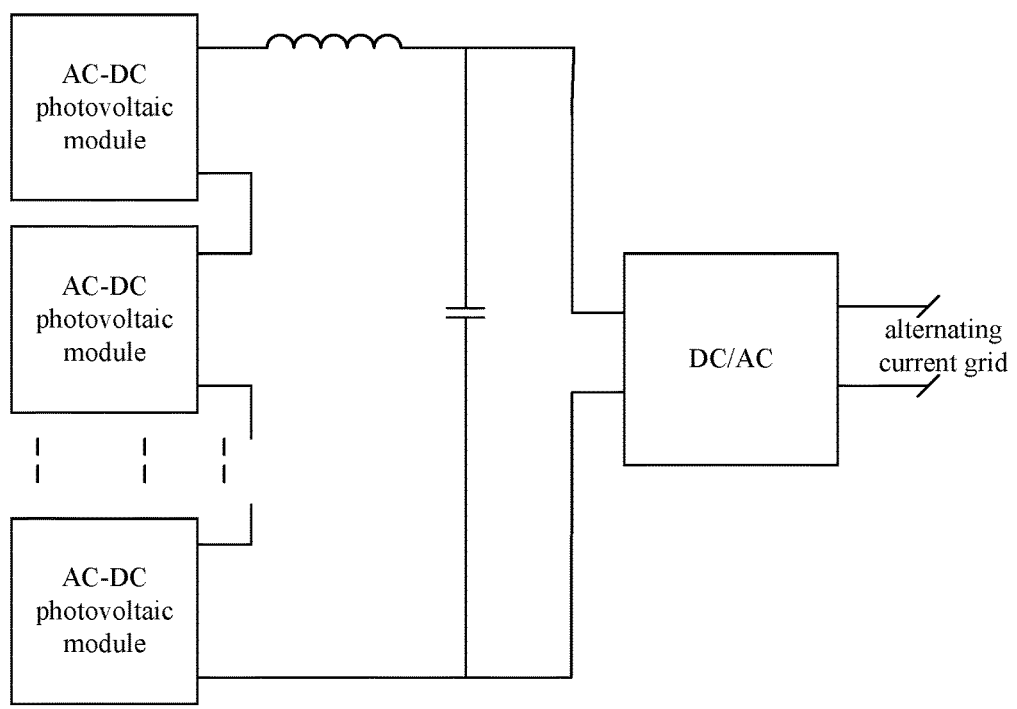
FIG. 8D is a schematic diagram showing a first embodiment that direct current power outputted by a photovoltaic device is merged into an alternating current power grid through an inverter according to the present disclosure.

Reference is made to FIG. 8D, in which there are multiple said photovoltaic devices, and the DC-PWM power switching circuit is configured to output a direct current PWM wave.

In this case, the multiple photovoltaic devices are connected in series and then connected with a DC/AC input terminal of an inverter, and an output terminal of the inverter is connected with the alternating current grid.

Figure 8E:
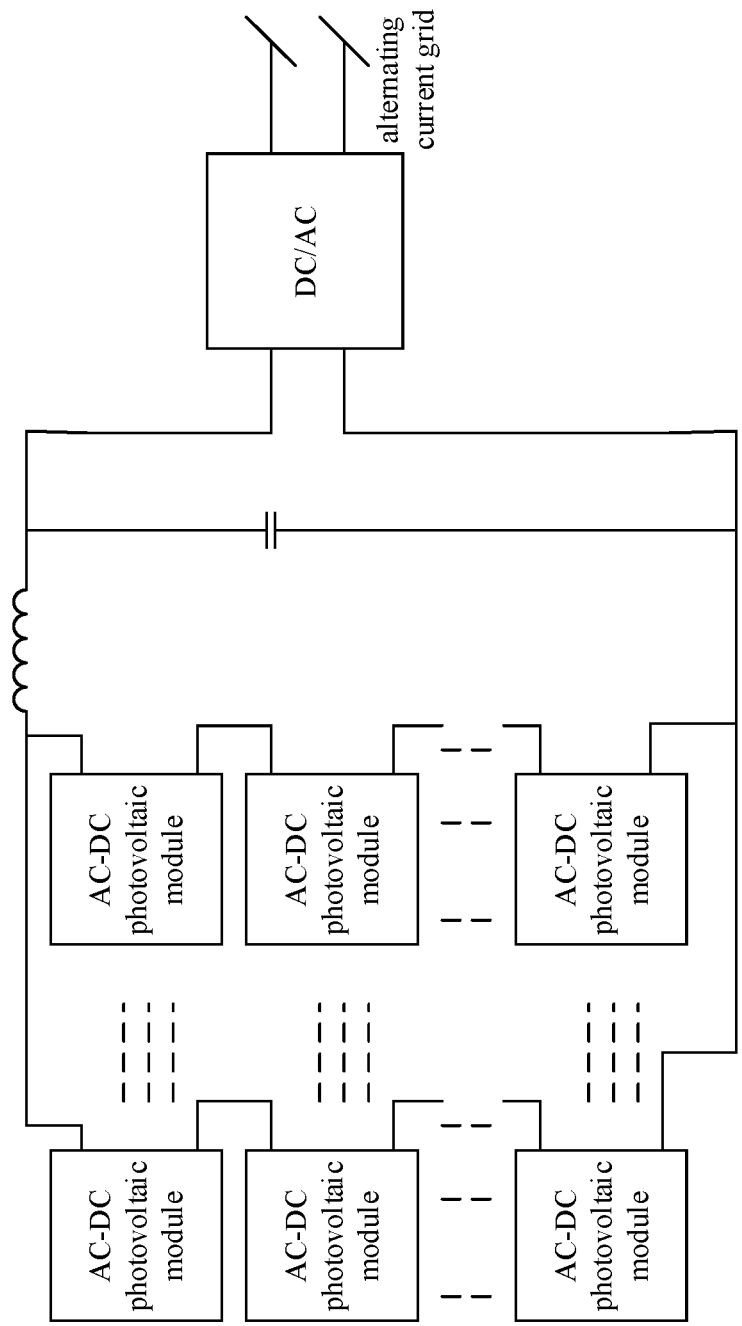
FIG. 8E is a schematic diagram showing a second embodiment that direct current power outputted by a photovoltaic device is merged into an alternating current power grid through an inverter according to the present disclosure.

Reference is made to FIG. 8E, in which multiple photovoltaic devices are connected in series-parallel and then connected with the DC/AC input terminal of the inverter, and the output terminal of the inverter is connected with the alternating current grid.

It should be noted that the difference between FIG. 8D and FIG. 8E lies in that the multiple photovoltaic devices in FIG. 8D are connected in series to increase the output voltage, while the multiple photovoltaic devices in FIG. 8E are connected in series-parallel to increase both the output voltage and the output current.

Figure 8F:
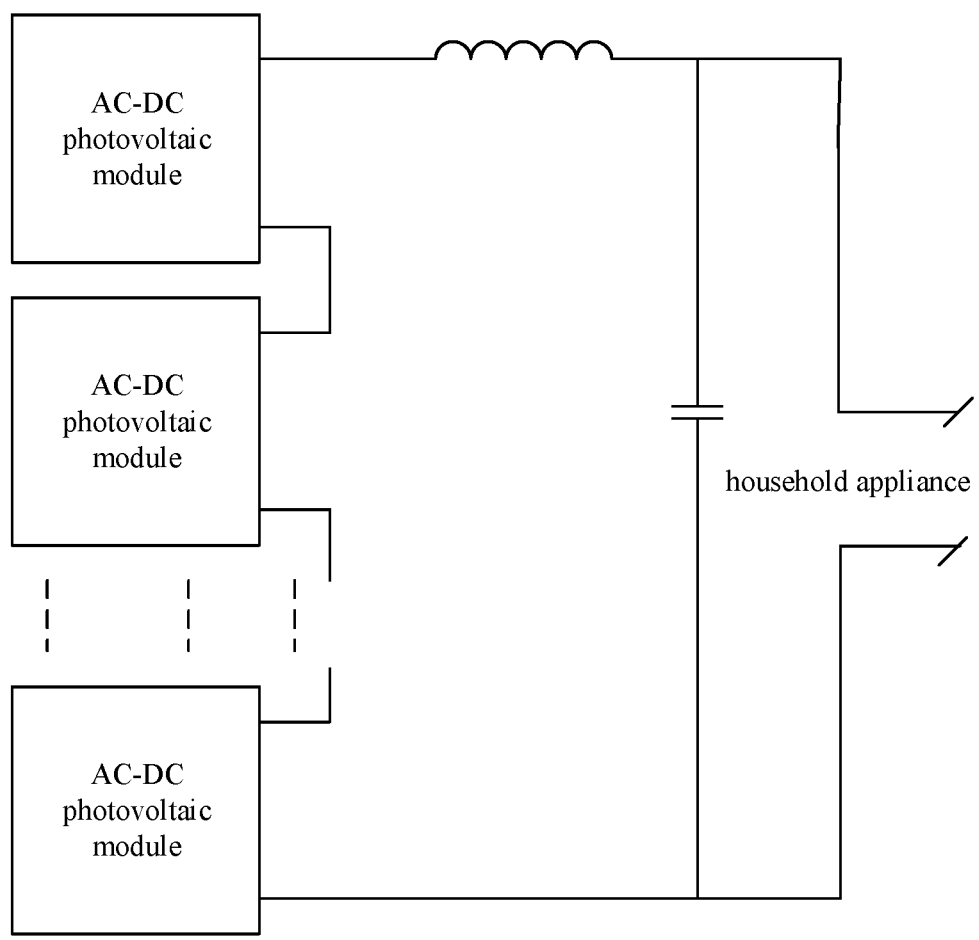
FIG. 8F is a schematic diagram of a photovoltaic device for supplying power to a household appliance according to the present disclosure.

Reference is made to FIG. 8F, in which there are multiple photovoltaic devices. In a case that the DC-PWM power switching circuit is configured to output an alternating current PWM wave, the multiple photovoltaic devices are connected in series to supply power to a household appliance.

Figure 8G:
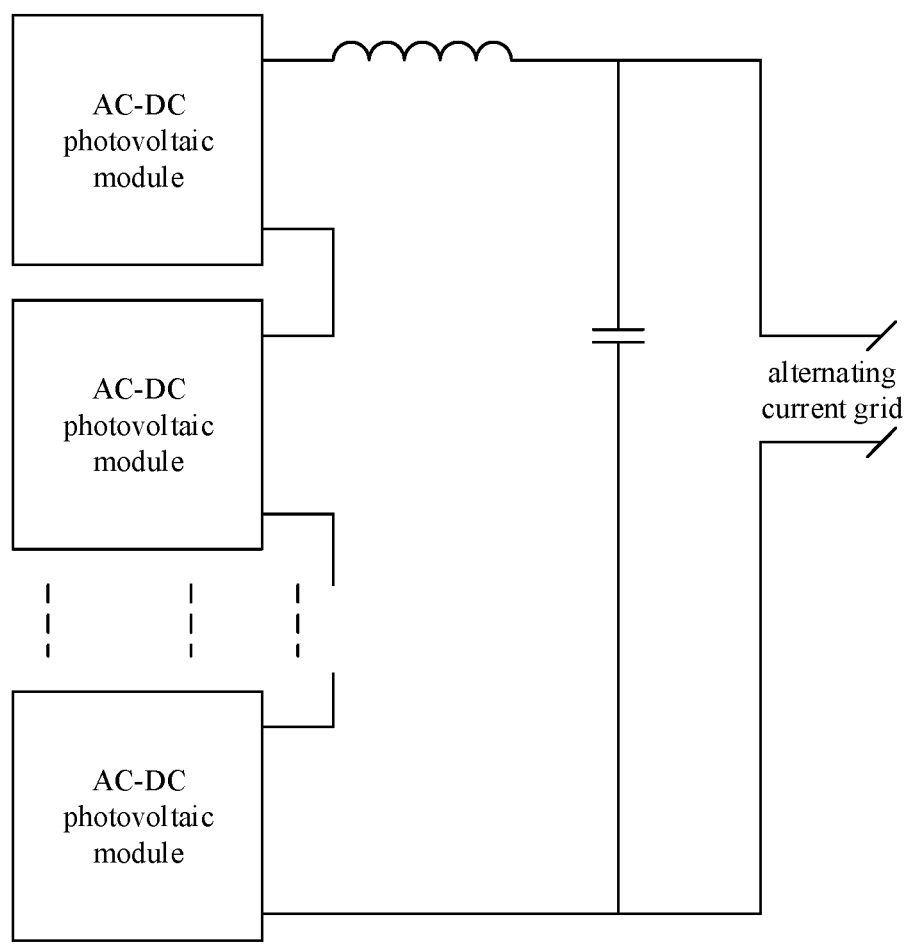
FIG. 8G is a schematic diagram showing a first embodiment that alternating current power outputted by a photovoltaic device is merged into an alternating current grid according to the present disclosure.

Reference is made to FIG. 8G, in which there are multiple photovoltaic devices. In the case that the DC-PWM power switching circuit is configured to output an alternating current PWM wave, the multiple photovoltaic devices are connected in series and then connected with the alternating current grid.

Figure 8H:
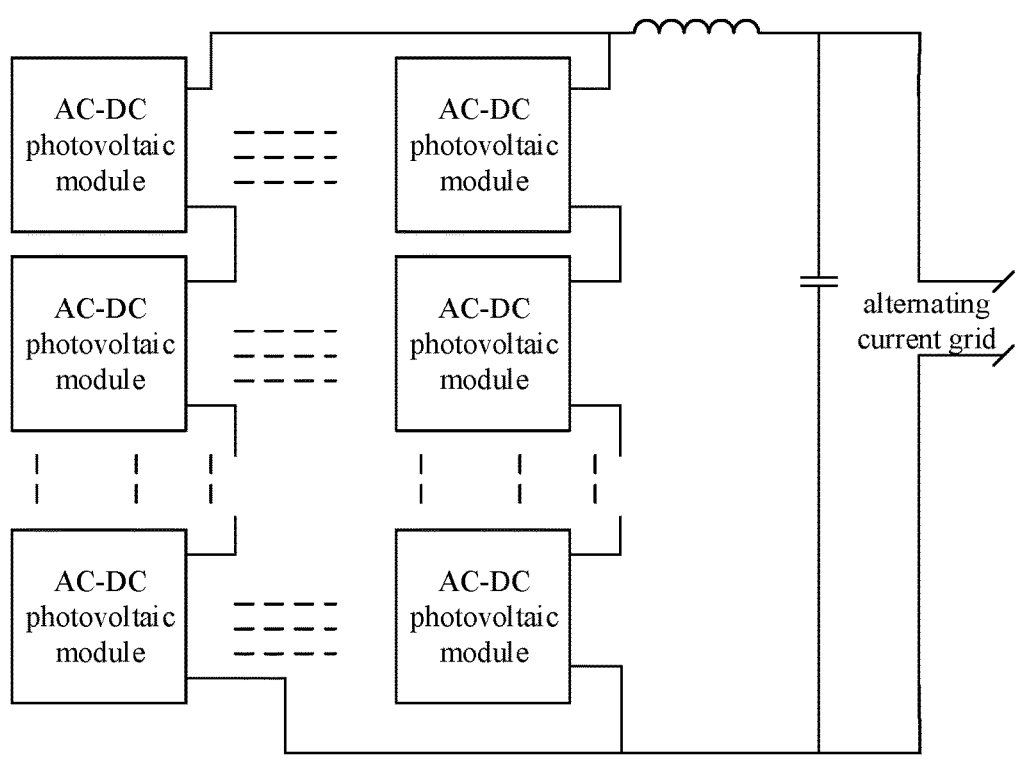
FIG. 8H is a schematic diagram showing a second embodiment that alternating current power outputted by a photovoltaic device is merged into an alternating current grid according to the present disclosure.

Reference is made to FIG. 8H, in which there are multiple photovoltaic device. In a case that the DC-PWM power switching circuit is configured to output an alternating current PWM wave, the multiple photovoltaic devices are connected in series-parallel and then connected with the alternating current grid.

The AC-DC photovoltaic device according to the above embodiment may be applied to various occasions. The DC-PWM power switching circuit is controlled by the controller to convert direct current power into a series of PWM waves. After the filters circuit filters the harmonic components out of the direct current PWM waves or alternating current PWM wave outputted by the AC-DC photovoltaic device, various voltage waveforms such as direct current waveforms or sinusoidal alternating current waveforms can be generated.

The above are only preferred embodiments of the present disclosure and are not intended to limit the present disclosure. Various changes, equivalents and modifications to the embodiments may be made to the technical solution by those skilled in the art according to the disclosed method and technical content without departing from the spirit or scope of the present disclosure. Therefore, any changes, equivalents and modifications which are made within the spirit and principle of the present disclosure shall fall within the protection scope of the present disclosure.

The invention claimed is:

1. An alternating-current direct-current (AC-DC) photovoltaic device, comprising:
    a photovoltaic module,
    a direct current side capacitor,
    a direct current pulse width modulation (DC-PWM) power switching circuit, and
    a controller, wherein
    the direct current side capacitor is connected in parallel with an output terminal of the photovoltaic module;
    an input terminal of the DC-PWM power switching circuit is connected with the output terminal of the photovoltaic module;
    the DC-PWM power switching circuit comprises a controllable switch transistor;
    the controller is configured to output a switch control signal to control a switching state of the controllable switch transistor in the DC-PWM power switching circuit, comprising: outputting a direct current modulation signal as the switch control signal to control the DC-PWM power switching circuit to output a direct current PWM wave and outputting an alternating current modulation signal as the switch control signal to control the DC-PWM power switching circuit to output an alternating current PWM wave.

2. The AC-DC photovoltaic device according to claim 1, wherein the DC-PWM power switching circuit is a full-bridge circuit.

3. The AC-DC photovoltaic device according to claim 1, wherein the DC-PWM power switching circuit is a three-level inverter topology circuit.

4. The AC-DC photovoltaic device according to claim 1, wherein
    the DC-PWM power switching circuit is configured to output the direct current PWM wave; and
    a load is a direct current motor or a Light Emitting Diode (LED) streetlamp.

5. The AC-DC photovoltaic device according to claim 2, wherein
    the DC-PWM power switching circuit is configured to output the direct current PWM wave; and
    a load is a direct current motor or a Light Emitting Diode (LED) streetlamp.

6. The AC-DC photovoltaic device according to claim 3, wherein
    the DC-PWM power switching circuit is configured to output the direct current PWM wave; and
    a load is a direct current motor or a Light Emitting Diode (LED) streetlamp.

7. The AC-DC photovoltaic device according to claim 1, wherein
    the DC-PWM power switching circuit is configured to output the direct current PWM wave; and
    a plurality of the AC-DC photovoltaic devices are connected in series to supply power to a high-voltage direct current communication system.

8. The AC-DC photovoltaic device according to claim 2, wherein
    the DC-PWM power switching circuit is configured to output the direct current PWM wave; and
    a plurality of the AC-DC photovoltaic devices are connected in series to supply power to a high-voltage direct current communication system.

9. The AC-DC photovoltaic device according to claim 3, wherein
    the DC-PWM power switching circuit is configured to output the direct current PWM wave; and
    a plurality of the AC-DC photovoltaic devices are connected in series to supply power to a high-voltage direct current communication system.

10. The AC-DC photovoltaic device according to claim 1, wherein
    the DC-PWM power switching circuit is configured to output the direct current PWM wave; and
    a plurality of the AC-DC photovoltaic devices are connected in series or in series-parallel, and then connected with an input terminal of an inverter, an output terminal of the inverter is connected with an alternating current grid.

11. The AC-DC photovoltaic device according to claim 2, wherein
    the DC-PWM power switching circuit is configured to output the direct current PWM wave; and
    a plurality of the AC-DC photovoltaic devices are connected in series or in series-parallel, and then connected with an input terminal of an inverter, an output terminal of the inverter is connected with an alternating current grid.

12. The AC-DC photovoltaic device according to claim 3, wherein
    the DC-PWM power switching circuit is configured to output the direct current PWM wave; and
    a plurality of the AC-DC photovoltaic devices are connected in series or in series-parallel, and then connected with an input terminal of an inverter, an output terminal of the inverter is connected with an alternating current grid.

13. The AC-DC photovoltaic device according to claim 1, wherein
   the DC-PWM power switching circuit is configured to output the alternating current PWM wave; and
   a plurality of the AC-DC photovoltaic devices are connected in series to supply power to a household appliance, or connected in series and then connected with an alternating current grid, or connected in series-parallel and then connected with an alternating current grid.

14. The AC-DC photovoltaic device according to claim 2, wherein
   the DC-PWM power switching circuit is configured to output the alternating current PWM wave; and
   a plurality of the AC-DC photovoltaic devices are connected in series to supply power to a household appliance, or connected in series and then connected with an alternating current grid, or connected in series-parallel and then connected with an alternating current grid.

15. The AC-DC photovoltaic device according to claim 3, wherein
   the DC-PWM power switching circuit is configured to output the alternating current PWM wave; and
   a plurality of the AC-DC photovoltaic devices are connected in series to supply power to a household appliance, or connected in series and then connected with an alternating current grid, or connected in series-parallel and then connected with an alternating current grid.

16. The AC-DC photovoltaic device according to claim 1, further comprising:
   a filter circuit, configured to filter a harmonic component out of the direct current PWM wave or the alternating current PWM wave outputted from the DC-PWM power switching circuit.

17. The AC-DC photovoltaic device according to claim 1, wherein the input terminal of the DC-PWM power switching circuit is directly connected with an output terminal of photovoltaic module; and the controller is configured to monitor a status of photovoltaic module and to realize a maximum power point tracking.

* * * * *